Figure 1:
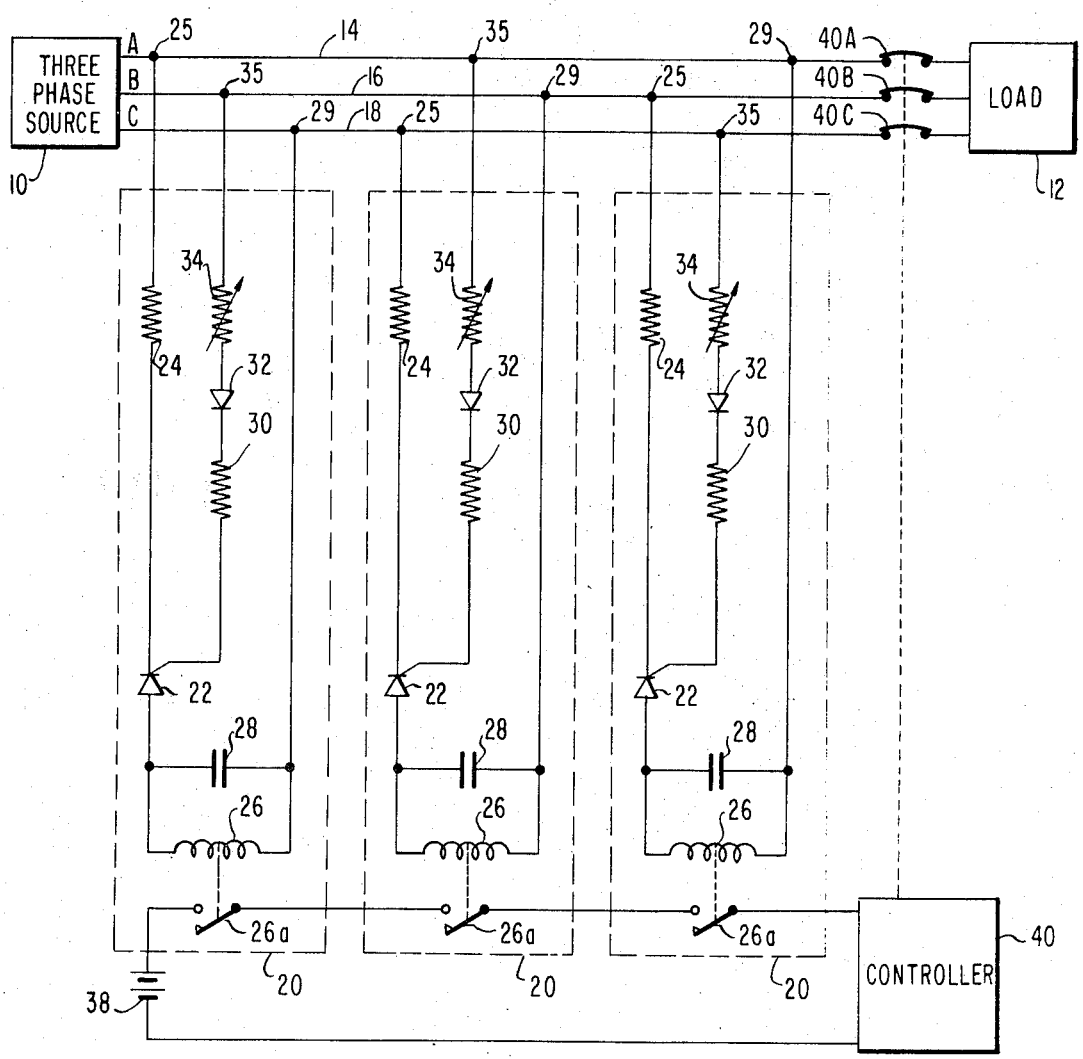

United States Patent

[11] 3,633,072

[72] Inventor Lawrence N. Duncan
  178 Elm Crest Drive, Wheeling, W. Va. 26003
[21] Appl. No. 13,724
[22] Filed Feb. 24, 1970
[45] Patented Jan. 4, 1972

[54] PHASE DETECTION CIRCUIT
  1 Claim, 2 Drawing Figs.
[52] U.S. Cl. .................................................. 317/27 R,
  307/127, 317/31, 317/33 SC, 317/48
[51] Int. Cl. .................................................. H02h 3/26
[50] Field of Search .......................................... 317/47,
  48, 27, 31, 33 SC; 307/127

[56] References Cited
  UNITED STATES PATENTS
  3,431,467  3/1969  Calfee ........................ 317/48 X
  3,495,130  2/1970  Bruner et al. ................. 317/48 X Primary Examiner—James D. Trammell
Attorneys—John W. Behringer, Eugene L. Bernard, Martin J. Brown, James N. Dresser and W. Brown Morton, Jr.

ABSTRACT: Apparatus for detecting the phase relationship and potential difference between the phases of a polyphase electrical circuit and for interrupting the circuit if a shift in phase or a decrease in potential difference occurs beyond acceptable limits. The current-passing terminals of a controlled switching device such as a silicon controlled rectifier are coupled in series with a control device across two phases of the polyphase circuit, while the control electrode such as the gate of the silicon controlled rectifier is coupled to a third phase. So long as the proper phase relationship and potential difference are maintained, current through the circuit is sufficient to maintain the control device in a first state. Should a phase shift or a decrease in potential difference, or a combination thereof, in excess of the allowable limits occur, current through the circuit is insufficient to maintain the control device in that first state, and the power applied from the polyphase source to its load is interrupted.

PATENTED JAN 4 1972  3,633,072

INVENTOR
LAWRENCE N. DUNCAN

BY McLean, Morton & Boustead

ATTORNEYS

PHASE DETECTION CIRCUIT

The present invention pertains to a power control circuit. More particularly, the present invention pertains to a circuit for controlling the power applied from a three-phase source to a load so that should a phase shift or a decrease in potential difference occur in the power phases, the circuit is interrupted to prevent application of this faulty power to the load, thereby ensuring that the load is not damaged.

Polyphase electric power sources such as three-phase sources are used extensively to power heavy machinery. Proper and safe operation of the machinery requires that the relationship between the different power phases be properly maintained. Likewise, such operation requires that the potential difference between the phases be maintained within acceptable limits. Generally, the polyphase power is obtained from a source which is supplying numerous pieces of equipment, particularly when the power is obtained from a commercial generating plant. The load placed on this power source by the various pieces of equipment sometimes results in a phase shift or a decrease in potential difference between the different phases of the polyphase power. While the equipment is generally capable of satisfactorily operating when supplied with such faulty polyphase power, excessive phase shift or decrease in potential in one of the phases can result in damage to the power generating equipment or to the load equipment because such a fault might cause the load equipment to draw a higher current than would otherwise be necessary.

Equipment has been developed for detecting excessive phase shift or potential drop in polyphase power sources, and in response to an excessive shift interrupting the power provided to a load. A first type of device of this sort is a voltage responsive device which interrupts the power as the voltage drops below a preset level. Such previously known devices of this type, however, compare the voltage of each phase of the polyphase voltage with a common or neutral reference. Three-phase equipment often is of a type which does not require a common conductor, and, consequently, utilization of such previously known voltage responsive devices necessitates the addition of a common conductor, with accompanying increases in complexity and cost. Another type of device used to protect loads attached to polyphase power sources is current responsive. Use of this type of device, however, requires that the current normally drawn be maintained within the limits to which the device is not responsive. This requirement makes such current responsive devices unsatisfactory for numerous applications. Other protection devices are mechanically actuated with the resultant inherent limitations.

The present invention is a circuit for sensing the phase relationship and the potential difference between various phases of a polyphase electrical power supply and in response to phase shift or decrease in potential difference, or a combination thereof, in excess of an acceptable limit, interrupting the power applied to the load attached to the polyphase power supply. In utilizing the present invention with a three-phase electrical power source, the current-passing terminals of a controlled switching device are coupled across two phases of the source, while the control element is coupled to the third phase. So long as the proper phase relationship and potential difference are maintained between the various power phases, current is passed by the controlled switching device for a sufficient percentage of time to maintain a control device in a first condition. Should a shift in phase relationship or a decrease in potential difference, or a combination thereof, occur beyond acceptable limits, current passes through the switching device for a smaller percentage of the time, finally reaching the point at which the control device assumes a second condition in response to which the power applied from the polyphase source to its load is interrupted. In a preferred embodiment of the present invention, the current-passage terminals of a solid state switching device such as a silicon controlled rectifier (SCR) are coupled in series with a relay coil across two phases of a three-phase power source, while the other terminal such as the gate of the SCR is coupled to the third phase in a manner which results in sufficient current flow through the relay coil to maintain the relay in its energized state so long as the proper phase relationship and potential difference exist in the three-phase power source. Upon a shift in phase or a decrease in potential difference, or a combination thereof, beyond an acceptable limit, the current is not maintained through the relay for a sufficient percentage of the time to keep the relay in its energized state. As a result, the control circuit interrupts the power applied to the load from the three-phase source.

Figure 2:
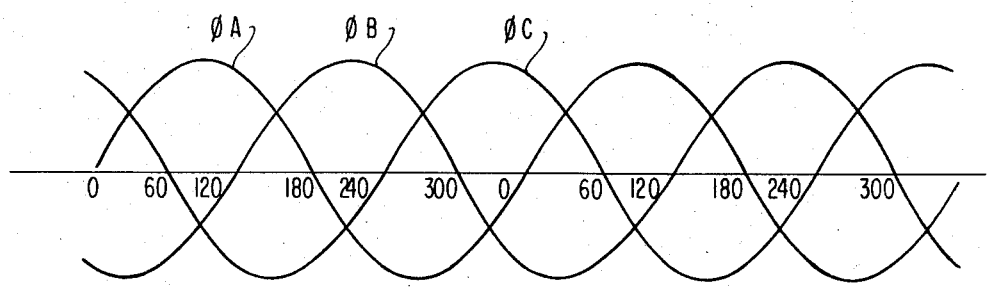

These and other aspects and advantages of the present invention are more apparent in the following description and claims, particularly when considered in conjunction with the accompanying drawings in which:

FIG. 1 is a schematic representation of a power control circuit connected to a three-phase voltage supply and load in accordance with the present invention; and FIG. 2 depicts waveforms of the three-phase voltage supply under ideal conditions.

As depicted in FIG. 1, three-phase source 10 supplies electrical power to load 12 by means of conductors 14, 16 and 18. The three power phases are designated phase A, phase B, and phase C on conductors 14, 16, and 18, respectively, and, as depicted in FIG. 2, phase B lags phase A by 120 electrical degrees, while phase C lags phase A by 240 electrical degrees. Three control circuits 20 are coupled to power lines 14, 16 and 18. The components within these three circuits 20 are identical, and so only the first will be described in detail. Silicon controlled rectifier (SCR) 22 has its cathode connected to one end of resistor 24, the second end of which is connected at terminal 25, to a first powerline. The anode of SCR 22 is tied to one side of relay coil 26 and to one plate of capacitor 28. The second side of coil 26 and the second plate of capacitor 28 are tied together and are connected at terminal 29 to a second powerline. The gate of SCR 22 is connected to one end of resistor 30, the second end of which is connected to the cathode of diode 32. The anode of diode 32 is tied to a terminal of variable resistor or rheostat 34, the second terminal of which is tied at terminal 35 to the third powerline.

Preferably, for optimum operation, the three control circuits 20 are connected to the power lines 14, 16, and 18 in a manner in which the terminal 35 connection to the gate of the SCR 22 in each control circuit 20 is coupled to a voltage phase which follows the voltage phase applied via that circuit's terminal 25 to the cathode of that SCR. Thus, in one of the control circuits 20 the SCR 22 gate is coupled via its terminal 35 to voltage phase B on powerline 16, while the SCR cathode is coupled via its terminal 25 to voltage phase A on powerline 14, and the SCR anode is coupled via coil 26 and terminal 29 to voltage phase C on powerline 18. Another of the control circuits has its SCR 22 gate coupled via that terminal 35 to voltage phase A on powerline 14, the SCR cathode connected via that terminal 25 to voltage phase C on powerline 18, and the SCR anode coupled via that relay coil 26 and terminal 29 to voltage phase B on powerline 16. In the third control circuit 20 the SCR 22 gate is coupled via its terminal 35 to voltage phase C on powerline 18, the SCR cathode is coupled via its terminal 25 to voltage phase B on powerline 16, and the SCR anode is coupled via its relay coil 26 and terminal 29 to voltage phase A on powerline 14.

Each relay coil 26 controls a normally open contact 26a, and these three relay contacts are connected in series between one side of voltage source 38 and one terminal of controller 40. The second side of voltage source 38 is tied to the second terminal of controller 40. Controller 40 operates circuit breakers 40a, 40b, and 40c which are positioned in the phase A, phase B, and phase C power lines 14, 16 and 18, respectively, between the three control circuits 20 and load 12.

Under normal operating conditions, the voltage applied to the control circuits 20 causes the three relays 26 to remain energized continuously so that a continuous circuit is provided from the first side of voltage source 38 to controller 40. In response, controller 40 maintains the three circuit breaker contacts 40a, 40b, and 40c in their closed condition so that three-phase electrical power is provided from source 10 to load 12. Thus, when the first control circuit 20, the phase B voltage or potential applied to the gate of SCR 22 is positive with respect to the phase A voltage or potential applied to the cathode of that SCR at a time when the phase C voltage or potential applied to the anode of that SCR is likewise positive with respect to phase A voltage or potential. Accordingly the SCR conducts, and current passes through relay coil 26 to energize the relay, closing contact 26a. This current likewise charges capacitor 28. Current continues to pass through SCR 22 until the phase C voltage or potential becomes negative with respect to the phase A voltage or potential. The energy on capacitor 28 maintains relay 36 in its energized condition until SCR 20 next conducts. Thus, contact 26a remains closed. In like manner the relay 26 in each control circuit 20 remains continuously energized so long as the three-phase voltage maintains the proper phase relationship and potential difference between the three phases, and the three relay contacts 26a remain closed, coupling the first side of voltage source 28 to the first terminal of controller 40. Controller 40, therefore, maintains the circuit breakers 40a, 40b, and 40c in their closed position, thereby supplying power from source 10 to load 12.

When a phase shift or a decrease in potential difference, or a combination thereof, occurs in the three-phase voltage applied from source 10, one of the three control circuits 20 does not pass current through its SCR 22 for a sufficient percentage of the time to maintain its relay 26 continuously in its energized condition. The corresponding contact 26a therefore opens, breaking the circuit between the first terminal of voltage source 38 and the first terminal of controller 40. In response to this, controller 40 opens circuit breakers 40a, 40b, and 40c, thereby isolating load 12 from source 10. Thus, source 10 and load 12 are protected against excessive current and other abnormalities which otherwise might result during such abnormal condition. The degree of phase shift or decrease in potential difference required to cause relay 26 to deenergize is controlled by the adjustment of rheostat 34. The circuit 20 which has its relay 26 deenergized depends upon which voltage phase has shifted or dropped in potential and whether that shift is in a positive or a negative direction. Preferably, controller 40 includes circuitry which must be manually reset before circuit breakers 40a, 40b, and 40c can again close, thereby preventing doorbell action. In some applications satisfactory protection can be obtained utilizing only two control circuits 20 since a shift of one voltage phase in one direction can be regarded as a shift of the other two phases in the opposite direction, and in certain applications satisfactory protection might be obtained from a single control circuit 20.

Although the present invention has been described with reference to a preferred embodiment, numerous modifications and rearrangements might also be made, and still the result would come within the scope of the invention.

What is claimed is:

1. An electrical circuit detecting phase relationship and potential differences including:
   a. a three-phase electrical source;
   b. a three-phase electrical load;
   c. a first, second and third electrical conductor, each conductor with respect to the other conductors carrying a leading phase, an intermediate phase and a trailing phase;
   d. a circuit breaker for each conductor, the improvement comprising:
   e. a circuit breaker controller circuit, said circuit breakers being responsive to a current in said controller circuit to close said breakers and responsive to an open circuit to open said breakers;
   f. three detection circuits, each with an input line, an output line and a controller line;
   g. three current means serially connected in said controller circuit each responsive to current between the input and output lines of a detection circuit to close the controller circuit and responsive to an open circuit in said detection circuit to open said controller circuit;
   h. the output line of each detection circuit connected to a different electrical conductor with respect to each other detection circuit, said conductor being the leading phase conductor for said detection circuit;
   i. the input line for each detection circuit connected to a different electrical conductor with respect to each other detection circuit, said conductor being the trailing phase with respect to the conductor which is connected to the output line;
   j. the controller line of each detection circuit connected to the third conductor, said conductor being with respect to the other conductors the intermediate phase conductor;
   k. in each detection circuit said controller line having a switching means allowing undirectional current flow from said conductor into each detection circuit;
   l. a controlled switching means having an input terminal connected to said input line, an output terminal connected to said output line and a controller terminal connected to said controller line.
   m. said controlled switching means normally open and closing to allow undirectional current flow when said input line is at a higher potential than said output line and said controller line is at a higher potential than said output line and remaining closed so long as said input line remains at a higher potential than said output line.

* * * * *